UNITED STATES PATENT OFFICE.

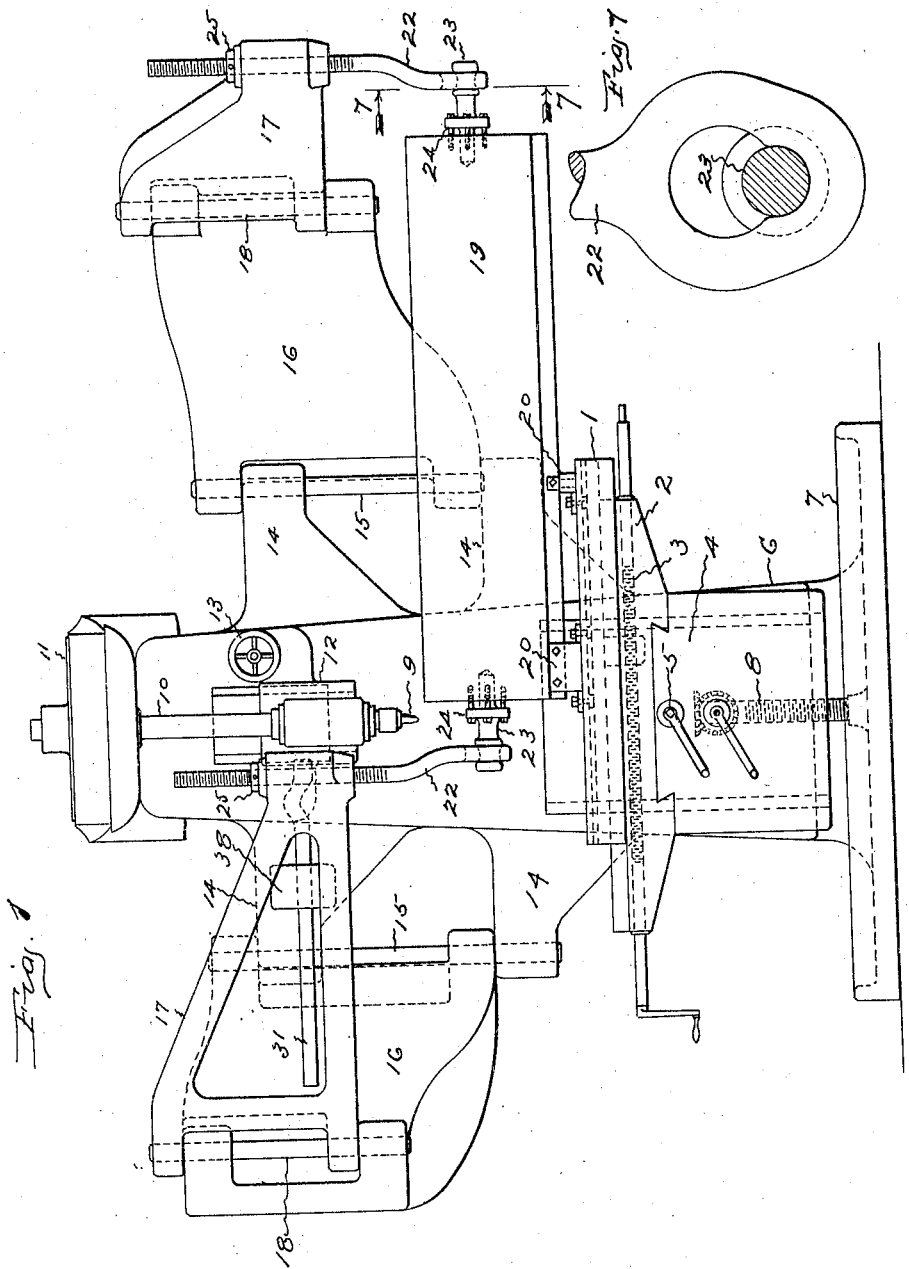

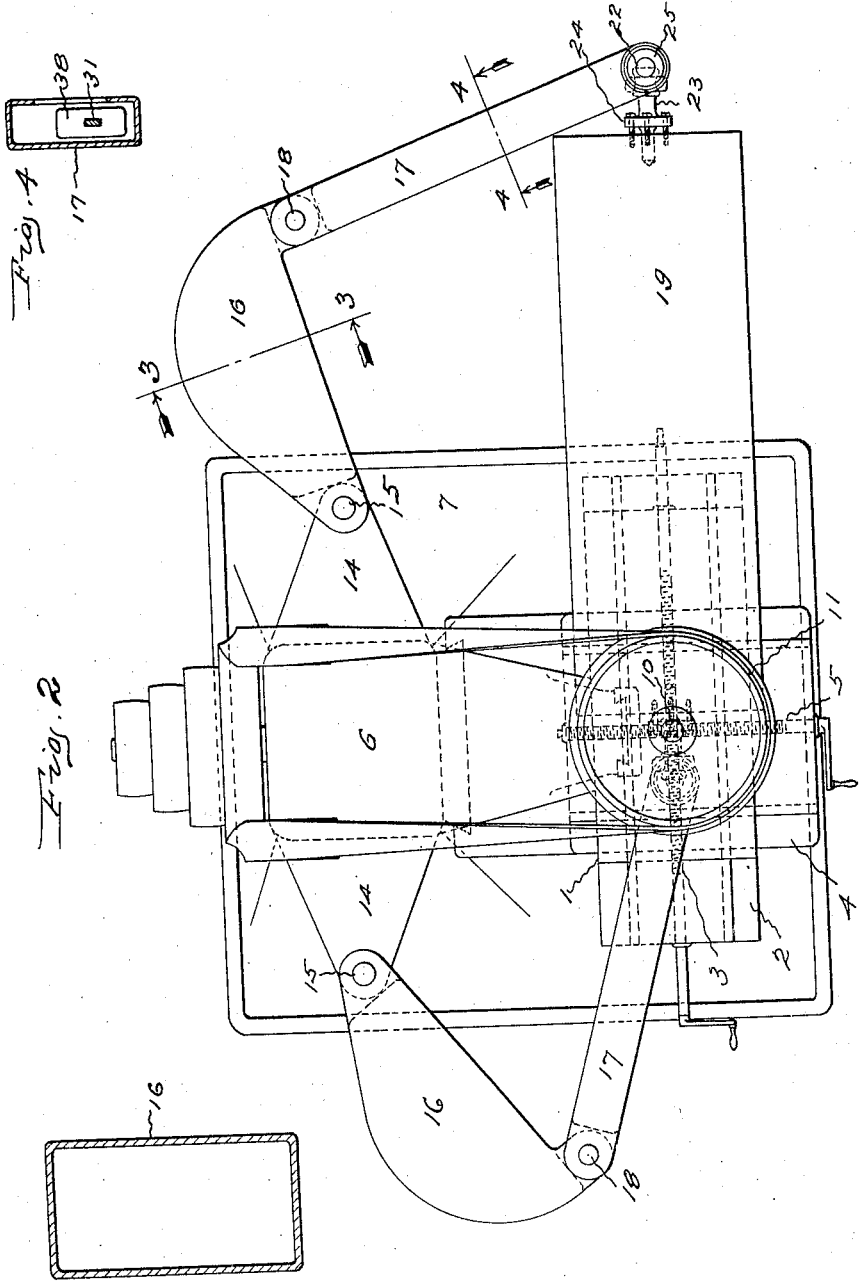

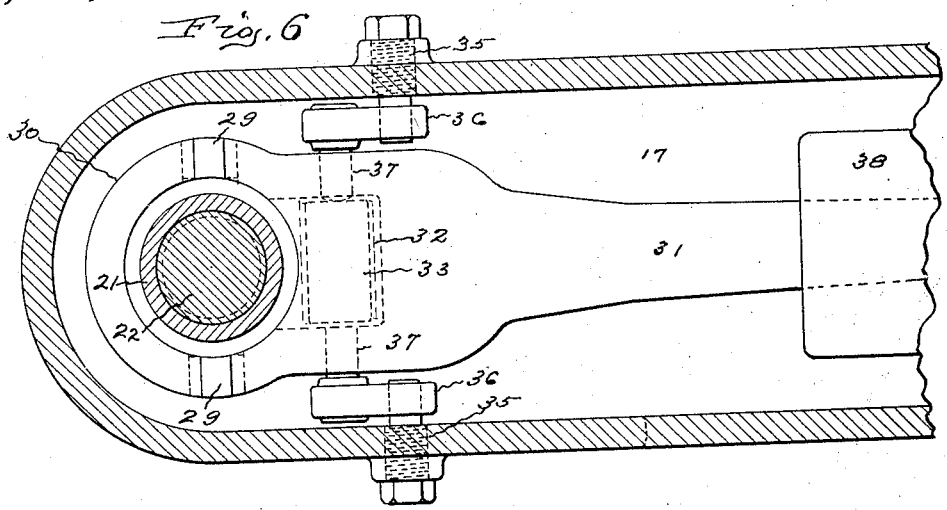
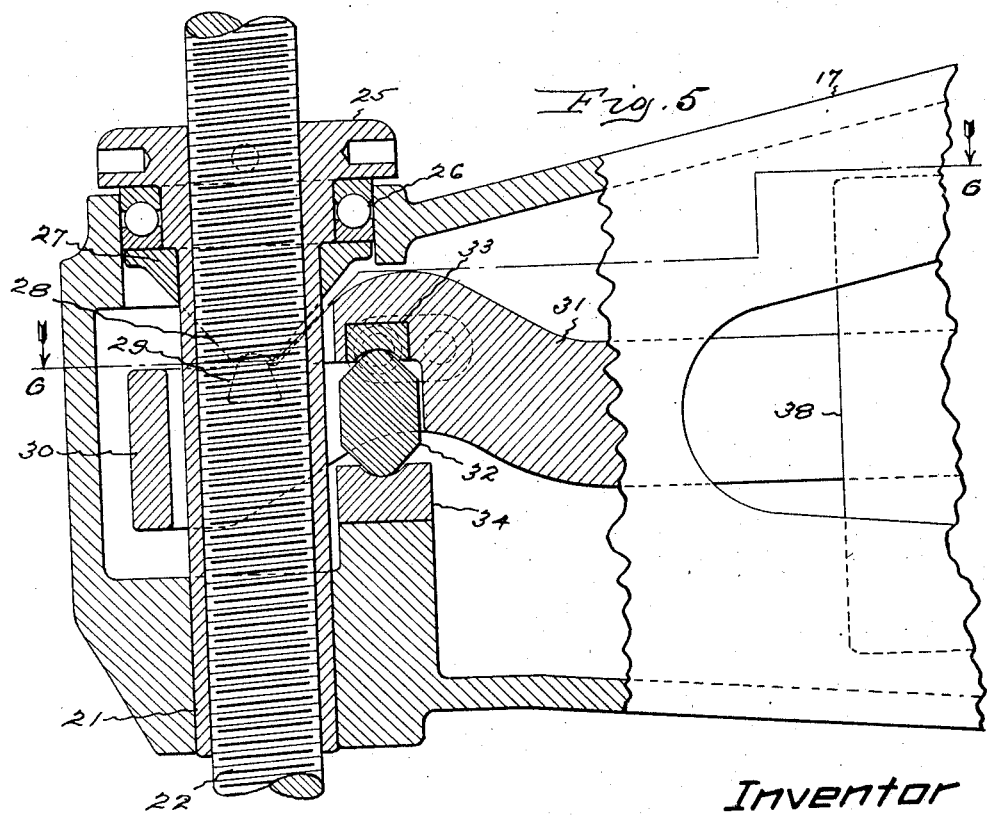

LOUIS GARFIELD BAYRER, OF HARTFORD, CONNECTICUT.

MILLING-MACHINE.

1,329,358.
Specification of Letters Patent.
Patented Feb. 3, 1920.

Application filed May 7, 1919. Serial No. 295,275.

*To all whom it may concern:*

Be it known that I, LOUIS G. BAYRER, a citizen of the United States, residing at Hartford, in the county of Hartford and State of Connecticut, have invented a new and useful Improvement in Milling-Machines, of which the following is a specification.

This invention relates to milling machines which are particularly adapted for die-sinking, although it is adaptable to milling and other machine tools which are used for shaping large and heavy pieces of metal. Large pieces are now commonly drop-forged. Such pieces require heavy dies which, of course, must be as accurate as small dies. In sinking dies the rotating cutter usually remains in one vertical plane while the die-stock is moved from side to side and forward and backward, according to the outline to be cut, by manipulating the table feed and saddle feed of the machine. It requires skill to feed the stock so that the tool will cut to the exact line—the operator keeps his eye on the line on the stock while manipulating one feed with one hand and the other feed with the other hand. With a long or large die it is awkward and difficult to get into such position that the eye can follow the line to be cut, and at the same time manipulate the feeds so the table will move smoothly and carry the stock in the necessary directions. If the stock is heavy and the table is large, the weight of the parts affects the free movement of the feeds necessary to make smooth and accurate cuts. This is particularly so if the die-stock is long and the cut is being made near an end, as the other end necessarily extends some distance beyond the center of the table and the center of gravity being on one side tends to cramp the table—causing it to bind.

The object of this invention is to provide a milling machine or the like machine tool which is designed to shape heavy pieces of stock, with means whereby the stock can be cradled or suspended and lifted to relieve the table of a part of the load so that wherever the cut is being made and in whatever position the stock is necessarily fed, the table is not subjected to unbalanced strains, enabling the feed to operate smoothly and uniformly, and the operator to give his whole attention to following the line of cut without exerting himself to give the required feed.

This object is attained by pivotally mounting upon the sides of the supporting column of the machine articulated arms that at their outer ends are provided with adjustable and counter-balanced means which may be attached to the ends of the stock to be operated upon, in such manner that the entire weight of the stock or any part of its weight may be supported by the arms, leaving the table to carry only a limited weight so that it can be moved freely, that is, the table is relieved of the maximum load and only bears such load and has such connection with the stock as is necessary to move the stock in the proper directions with relation to the milling cutter as the opening to be cut requires.

In the accompanying drawings the invention is illustrated as adapted to a well known type of milling machine which is commonly used for heavy die-sinking, and Figure 1 shows a front view of such a machine provided with the improvement. Fig. 2 shows a plan view of the same. Fig. 3 shows a section on the line 3—3 on Fig. 2. Fig. 4 shows a section on the line 4—4 on Fig. 2. Fig. 5 shows, on enlarged scale, a vertical section through the outer end of one of the stock carrying arms, illustrating means for adjusting and counterbalancing the stock support. Fig. 6 shows a section looking down on the plane indicated by the line 6—6 on Fig. 5. Fig. 7 is a view looking at the lower end of one of the stock supporting rods at the end of the swinging arm, the section being vertical and taken on the plane indicated by the line 7—7 on Fig. 1.

The table 1 of the milling machine illustrated is mounted on top of the saddle 2 so that it may be moved back and forth from side to side in the usual manner by turning the feed screw 3. The saddle is mounted on top of the knee 4 so that it with the table may be moved back and forth from front to rear in the usual manner by turning the feed screw 5. The knee with the saddle and table is movable up and down on the column 6 which rises from the base 7, the usual elevating screw 8 being provided for this purpose. The milling cutter 9 is attached to the end of the spindle 10, provided with a pulley 11, that is rotarily mounted in bearings in a head 12 which is mounted so that it may be moved up and down on the face of the column. These parts and the feeding mechanisms are of common construction and arrangement, and being well known and forming no material feature of the invention, the details of their construction and arrangement are not specifically set forth.

Projecting from each side of the column are fixed brackets 14, and supported on each pair of these brackets and pivotally connected thereto by a pin 15 is an articulated arm, comprising an inner member 16 and an outer member 17, which are hinged together by a pin 18. These arms are given the necessary shape to provide the requisite strength to sustain the strains to which they will be subjected and are desirably made hollow so as to eliminate as much weight as possible.

At the outer ends of the outer members of the arms are means designed to be attached to the ends of the block of metal 19 in which the die is to be cut, this stock being fastened by suitable clamp 20 to the top of the table. The means illustrated for supporting the end of the die stock consists of a sleeve 21 which is loosely mounted in the end of the arm and has an interior thread through which passes a threaded rod 22. The lower end of the rod 22 is provided with an opening for receiving the stud 23 which is by suitable means 24 fastened to the end of the die-stock. The upper end of the sleeve has a head 25 that may be rotated for the purpose of raising or lowering the threaded supporting rod and thus lifting or lowering the die-stock. The sleeve which carries the threaded rod is free to have a slight vertical movement in the opening in the outer end of the arm and ball bearings 26 are provided so as to relieve the friction when the sleeve is rotated. Below, and supporting the head, is a collar 27 that on each side of the sleeve has a downwardly projecting tapering saddle 28 that rests upon the upper edge of a hardened block 29 set into the upper edge of a ring 30 at the end of a counterbalancing lever 31. This counterbalancing lever is fulcrumed on a hardened fulcrum block 32 that extends between a hardened bearing block 33 set into the lever and a hardened bearing block 34 mounted in the supporting arm. For the purpose of retaining the counterbalance lever in place without interfering with its rocking on the fulcrum, screw studs 35 are turned in through the walls of the arm, and on these screw studs are links 36 which carry studs 37 that project into the end of the lever, and desirably abut against the bearing block 33 and fulcrum block 32 to keep them in position. Movable along the lever is a counterbalancing weight 38. The side wall of the outer member of the arm is cut away so that this counterbalance weight may be reached and moved back and forth along the lever for the purpose of adjusting its lifting weight.

In using this structure the stock in which the die is to be sunk is placed upon the table and fastened thereto so that it will move from side to side and back and front beneath the milling cutter as the table is fed by the manipulation of the feeds under the control of the operator. The swinging arms are brought around adjacent to the ends of the stock to be cut and the depending screw rods adjusted to the required position and attached to the ends of the stock. After the rods have been connected with the stock the sleeves may be turned so as to draw up the screw rods and cause them to pull tightly on the ends of the stock. The counterbalance weight is then adjusted along the counterbalance lever so as to relieve the table and saddle of just the necessary amount of weight to enable the stock to be fed freely. This structure not only relieves the table of a part of the weight of the stock so that the feeds will operate freely, but also supports the stock at each end so that when a long, heavy piece is being cut in such a locality that a considerable length projects out beyond the table and saddle, the overhanging weight will not cramp the parts and interfere with the feed. Furthermore, if it is desired for the purpose of putting blocks or other means under the stock so as to tilt it, the whole weight of the stock can be supported by these arms while the table is lowered away from the under side of the stock to receive the necessary blocks or supporting means. As the die stock is suspended by the swinging arms it moves very freely from position to position and all that is necessary is to fasten it to the table so that it will be held firmly and be guided by the table. When the die-stock is supported in this manner the feeds are relieved of all strain and can be freely manipulated so that the operator can guide the stock very closely and smoothly along the path which is to be cut, without straining or paying much attention to the feeds, or diverting his attention from the stock and cutter in order to make the required feeds. The result of this is that the walls of the die opening may be finished very smoothly.

The invention claimed is:—

1. A machine tool having a column, a cutting tool mounted on the column, a table movably mounted on the column below said tool, mechanism for feeding the table horizontally, articulated arms pivotally mounted on the column and adapted to swing above the table, and stock supporting means carried by said arms.

2. A machine tool having a column, a cutting tool mounted on the column, a table movably mounted on the column below said tool, mechanism for feeding the table horizontally, articulated arms pivotally mounted on the column and adapted to swing above the table, stock supports carried by said arms, and means for adjusting said supports vertically.

3. A machine tool having a column, a cutting tool mounted on the column, a table movably mounted on the column below said tool, mechanism for feeding the table horizontally, articulated arms pivotally mounted on the column and adapted to swing above the table, stock supports loosely mounted on said arms, and counterbalancing means adapted to lift said supports.

4. A machine tool having a column, a cutting tool mounted on the column, a table movably mounted on the column below said tool, mechanism for feeding the table horizontally, articulated arms pivotally mounted on the column and adapted to swing above the table, stock supports loosely mounted on said arms, means for adjusting said supports vertically, and counterbalancing means adapted to lift said supports.

5. A machine tool having a column, a cutting tool mounted on the column, a table movably mounted on the column below said tool, mechanism for feeding the table horizontally, articulated arms pivotally mounted on the column and adapted to swing above the table, stock supports loosely mounted on said arms, levers carried by the arms and adapted to lift said supports, and weights adjustable on said levers.

6. A machine tool having a column, a cutting tool mounted on the column, a table movably mounted on the column below said tool, mechanism for feeding the table from side to side and forward and back, articulated arms pivotally mounted on the column and adapted to swing above the table, and stock supporting means carried by said arms.

7. A machine tool having a column, a cutting tool mounted on the column, a table movably mounted on the column below said tool, mechanism for feeding the table vertically and horizontally, articulated arms pivotally mounted on the column and adapted to swing above the table, and vertically adjustable stock supports carried by said arms.

8. A machine tool having a column, a cutting tool mounted on the column, a table movably mounted on the column below said tool, mechanism for feeding the table vertically and horizontally, articulated arms pivotally mounted on the column and adapted to swing above the table, stock supports loosely mounted on said arms, and counterbalancing means engaging and adapted to lift said supports.

9. A machine tool having a column, a cutting tool mounted on the column, a table adjustable vertically and horizontally on the column below said tool, mechanism for feeding the table horizontally, articulated arms pivotally mounted on the column and adapted to swing above the table, stock supports mounted on said arms, and threaded means for adjusting the height of said stock supports.

10. A machine tool having a column, a cutting tool mounted on the column, a table movably mounted on the column below said tool, mechanism for feeding the table, articulated arms pivotally mounted on the column and adapted to swing above the table, stock supports loosely mounted on said arms, threaded means for adjusting the height of said stock supports, and counterbalancing means adapted to lift said threaded means.

11. A machine tool having a column, a cutting tool mounted on the column, a table movably mounted on the column below said tool, mechanism for feeding the table, articulated arms pivotally mounted on the column and adapted to swing above the table, stock supports mounted on said arms, threaded means for adjusting the height of said stock supports, levers engaging and adapted to lift said threaded means, and weights adjustable on said levers.

12. A machine tool having a column, a stock table movably mounted on the column, mechanism for feeding the table, articulated arms pivotally mounted on the column and adapted to swing above the table, and stock supports carried by said arms.

13. A machine tool having a column, articulated arms pivotally mounted on each side of the column and adapted to swing in front thereof, and stock supports carried by said arms.

LOUIS GARFIELD BAYRER.